United States Patent Office 3,714,179
Patented Jan. 30, 1973

3,714,179
1-ALKYL-2-FURFURYLTHIOIMIDAZOLES AND CONGENERS
Robert C. Tweit, Wilmette, Ill., assignor to G. D. Searle & Co., Chicago, Ill.
No Drawing. Continuation-in-part of applications Ser.. No. 773,634, Nov. 5, 1968, and Ser. No. 55,621, July 16, 1970. This application Sept. 8, 1970, Ser. No. 70,569
Int. Cl. C07d 49/36
U.S. Cl. 260—309         12 Claims

ABSTRACT OF THE DISCLOSURE

Certain 1-alkyl - 2 - furfurylthioimidazoles and congeners—for example 2-furfuryl-1-methylimidazole hydrochloride and 2-(o-butylthiobenzylthio)-1-methyl imidazole hydrochloride—useful by reason of their valuable biological properties—including antiprotozoal, anti-bacterial, anti-fungal, anti-algal, anti-germinant, and anti-inflammatory activities—are disclosed.

---

The application for Letters Patent securing the invention hereinafter described and claimed is a continuation-in-part of applicant's prior copending applications Ser. No. 55,621 filed July 16, 1970, and Ser. No. 773,634 filed Nov. 5, 1968 and now abandoned.

This invention relates to 1 - alkyl-2-furfurylthioimidazoles and congeners, and to processes for the preparation thereof. More particularly, this invention provides new, useful, and unobvious chemical compounds having the formula

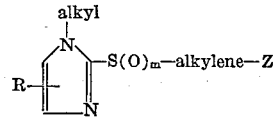

wherein R represents hydrogen or alkyl, $m$ represents 0 or a positive integer less than 3, and Z represents (a) furyl optionally substituted by nitro, or
(b) phenyl substituted by alkylthio, alkylsulfonyl, or sulfamoyl.

Positioning of the aforesaid phenyl and furyl substituents about the involved rings is not critical, nor is the point of attachment of these rings to the remainder of the molecule.

Among the alkyls called for above, lower alkyls are preferred, which is to say methyl, ethyl, propyl, isopropyl, butyl, isobutyl, sec.-butyl, tert.-butyl, pentyl, neopentyl, hexyl, isohexyl, and like monovalent, saturated, acyclic, straight- or branched-chain hydrocarbon groupings of empirical formula

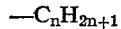

wherein $n$ represents a positive integer less than 8. Further, the alkylenes contemplated are preferably bivalent, saturated, acyclic, straight- or branched-chain, hydrocarbon groupings of empirical formula

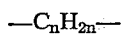

wherein $n$ is defined as before. Illustrative of such groupings are methylene, ethylene, trimethylene, propylene, tetramethylene, 1,1 - dimethylethylene, pentamethylene, 2,2-dimethyltrimethylene, etc.

Equivalent to the foregoing compounds for the purposes of this invention are corresponding acid addition and quaternary ammonium salts of the formula

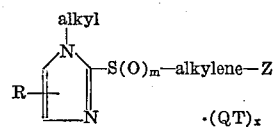

wherein R, $m$, and Z are defined as before; Q represents hydrogen, lower alkyl, hydroxy(lower alkyl), lower alkenyl such as vinyl and allyl, or aralkyl such as benzyl and phenethyl; T represents 1 equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, maleate, tartrate, citrate, gluconate, ascorbate, benzoate, cinnamate, or the like—which, in combination with the cationic portion of a salt aforesaid, is neither biologically nor otherwise incompatible; and $x$ represents 0 or 1, its precise value being dependent upon the number of basic nitrogens involved in salt formation.

Equivalent to the foregoing compounds (including salts) for the purposes of this invention are solvates thereof in which biologically insignificant solvent—for example, an equimolar amount or less of dioxane or 2-propanol—is present.

The compounds to which this invention relates are useful by reason of their valuable biological properties. Thus, for example, they inhibit the growth of protozoa such as *Tetrahymena gelleii* and *pyriformis*, *Tritrichomonas foetus*, and *Trichomonas vaginalis*; bacteria such as *Diplococcus pneumoniae*, *Staphylococcus aureus*, and *Erwinia* sp.; fungi such as *Candida albicans* and *Trichophyton mentagrophytes*; algae such as *Chlorella vulgaris*; and dicotyledonea such as *Trifolium repens*. They also counteract the granuloma formation characteristic of the inflammatory response to tissue insult.

The anti-protozoal utility of the instant compounds is evident from the results of standardized tests for their capacity to inhibit the growth of *Trichomonas vaginalis* or *Tritrichomonas foetus* conducted as follows: To 80 volumes of a modified Diamond medium prepared by mixing 1200 parts of trypticase (Baltimore Biological Laboratories), 600 parts of yeast extract (Difco), 300 parts of maltose, 60 parts of L-cysteine hydrochloride, 12 parts of L-ascorbic acid, 48 parts of dibasic potassium phosphate, 48 parts of monobasic potassium phosphate, and 54,000 parts of distilled water; adjusting the pH to 6.8 with 4% sodium hydroxide; incorporating 30 parts of agar (Baltimore Biological Laboratories); boiling for 1 minute to dissolve the agar; and sterilizing in an autoclave, is aseptically added 20 volumes of sterile Dubos medium serum. The resultant medium is inoculated with 1% (by volume) of either a 48-hr. or a 72-hr. culture of *T. vaginalis* or *T. foetus*, whereupon 1 ml. of the inoculated medium is mixed with 10 mg. of test compound. The mixture is incubated anaerobically at 37° C. for 48 hrs. and then examined microscopically for the presence of motile trichomonads. If any are observed, the compound is considered inactive. If no motile trichomonads are observed, 0.1 ml. of the incubated mixture is serially diluted and mixed with additional quantities of the inoculated medium sufficient to produce concentrations of 1000, 100, 10, and 1 mcgm. of test compound per ml.; and the resultant mixtures are inoculated anaerobically as before at 37° C. for 48 hrs. and then examined microscopically for motile trichomonads. Controls are provided by concurrent incubations identical with the foregoing except for the absence of test compound.

Further evidence of the anti-protozoal utility of the instant compounds is provided by the results of a standardized test for their capacity to inhibit the growth of *Tetrahymena pyriformis*. In this test, a nutrient broth consisting of 12 gm. of proteose peptone, 8 gm. of sucrose, and 500 ml. of water is sterilized and inoculated with 10% (by volume) of an axenic culture of *T. pyriformis*. Meanwhile, compound is heated in sterile distilled water at a concentration of 2000γ per ml. and a temperature of 80° C. for 20 min. An equivolume mixture of this compound preparation and the inoculated medium is incubated aerobically at 32° C. for 48 hrs. and then examined microscopically for the presence of motile tetrahymena. If they are observed, the compound is considered inactive. If no motile tetrahymena are observed, the incubated mixture is serially diluted and mixed with an inoculated medium of the same composition as that described above excepting that 1000 ml. of distilled water instead of 500 ml. and 5% (by volume) of the culture instead of 10% are incorporated. Amounts of the latter medium added are such that concentrations of 100, 10, and 1γ of compound per ml. result. The mixtures thus obtained are incubated as before and then examined microscopically for motile tetrahymena. Controls are provided by concurrent incubations identical with the foregoing except for the absence of compound.

Still further evidence of the anti-protozoal activity of the instant compounds is provided by the results of a standardized test for their capacity to inhibit the growth of *Tetrahymena gelleii*. In this test, a nutrient broth consisting of 12 gm. of proteose peptone, 8 gm. of sucrose, and 1000 ml. of water is sterilized, inoculated with an axenic culture of the test organism, and incubated at approximately 25° C. for 24 hrs., whereupon 0.5 ml. quantities are aseptically transferred to each of two test tubes, one of which contains approximately 5 mg. of compound. After a second 24-hrs. incubation at approximately 25° C., growths of the organism are compared by microscopic examination.

The anti-bacterial utility of the instant compounds is evident from the results of standardized tests such as, for example, one wherein sterile blood agar plates are inoculated with *Diplococcus pneumoniae*, approximately 5 mg. of compound is placed on the surface of each plate so as to cover a circle approximately 4 mm. in diameter, and the plates are thereupon incubated for 24 hrs. at 36° C. Clear zones of inhibition signify the utility in question.

Further evidence of the anti-bacterial utility of the instant compounds is provided by the results of a standardized test for their capacity to inhibit the growth of *Erwinia* sp. In this test, nutrient broth (manufactured by Baltimore Biological Laboratories or Difco) is prepared at twice the concentration recommended by the manufacturer, sterilized, and inoculated with 2% (by volume) of a culture of the test organism. Meanwhile, compound is heated in sterile distilled water at a concentration of 2000γ per ml. and a temperature of 80° C. for 20 min. An equivolume mixture of this compound preparation and the inoculated broth is incubated aerobically at 37° C. for 24–48 hrs. and then examined grossly for growth of the organism. If growth is observed, the compound is considered inactive. If no growth is observed, the incubated mixture is serially diluted and mixed with an inoculated broth of the same composition as before excepting that the concentration is halved and 1% (by volume) of the culture instead of 2% is incorporated. Amounts of the latter broth added are such that concentrations of 100, 10, and 1γ of compound per ml. result. The mixtures thus obtained are incubated as before and then examined grossly for growth of the organism. Potency is expressed as the minimum concentration at which no growth of test organism is discernible. Controls are provided by concurrent incubations identical with the foregoing except for the absence of compound.

The anti-fungal utility of the instant compounds is evident from the results of standardized tests whereby sterile mycophil agar plates are inoculated with *Tricophyton mentagrophytes* or *Candida albicans*, approximately 5 mg. of compound is placed on the surface of each plate so as to cover a circle approximately 4 mm. in diameter, and the plates are incubated for 96 hrs. at 25° C. without artificial light. Clear zones of inhibition signify the utility in question. Undecylenic acid and nystatin serve as reference standards, respectively.

Further evidence of the anti-fungal activity of the instant compounds is provided by the results of standardized tests whereby a mixture of 10 mg. of compound with 10 ml. of melted Sabouraud agar is heated at 80° C. for 20 min., then serially diluted and mixed with sufficient additional melted Sabouraud agar to produce concentrations of 1000, 100, 10, and 1 mcgm. of compound per ml. The resultant mixtures are allowed to cool and solidify, whereupon they are surface-inoculated with a suspension of *Trichophyton mentagrophytes* or *Candida albicans* and then incubated at room temperatures. The incubation period is 6–7 days for *T. mentagrophytes* and 48 hrs. for *C. albicans*. Controls are provided by concurrent incubations identical with the foregoing excepting that no compound is present. Activity is determined by gross examination and expressed as mcgm. of compound per ml. wherein no growth of the test organism is visible.

The anti-algal utility of the instant compounds is evident from the results of a standardized test whereby a sterile Bristol agar plate is inoculated with *Chlorella vulgaris*, approximately 5 mg. of compound is placed on the surface of the plate so as to cover a circle roughly 4 mm. in diameter, and the plate is incubated at 25° C. under artificial light for 5–7 days. A clear zone of inhibition signifies the utility in question. Copper sulfate serves as the reference standard.

The anti-germinant utility of the instant compounds is evident from the results of a standardized test whereby three 42.5 mm. (diameter) filter paper discs are stacked in each of two 60 mm. Petri dishes, each stack is moistened with 2 ml. of distilled water, 10 white clover (*Trifolium repens*—a representative dicotyledon) seeds are arranged atop each stack at approximately equal intervals around the periphery, approximately 5 mg. of compound is placed in the center of one seed circle (the other serves as control), the dishes are covered with glass lids and then incubated at room temperatures for 10 days, and germination in the control dish is thereupon compared with that in the dish containing seeds exposed to test compound.

The anti-inflammatory utility of the instant compounds is evident from the results of a standardized test for their capacity to inhibit the formation of granuloma tissue induced in adrenalectomized rats by implanted cotton. The procedure is a modification of one described by Dulin in Proc. Soc. Exp. Biol. Med., 90, 115 (1955). Male Sprague-Dawley rats weighing 180–220 gm. are adrenalectomized, and their drinking water is thereafter replaced by aqueous 0.86% sodium chloride supplemented during the first 24 hours by glucose q.s. 5%. On the day after the adrenalectomy, 4 pellets of dental cotton weighing 5–7 mg. apiece are separately, subcutaneously, and bilaterally implanted in the pectoral and dorsal lateral neck region of each animal, whereupon the prescribed dose (initially, 20 mg. intragastrically) of compound to be tested, dissolved or suspended in a vehicle consisting of 0.5 ml. of either corn oil or a mixture of 20 ml. of aqueous 0.86% saline with 1 drop of polysorbate 80, is administered intragastrically or subcutaneously to each of 3–6 animals. A like group of animals to which is identically and concurrently administered vehicle alone serves as controls. This treatment is repeated the next day. The day after that the animals are sacrificed; and the pellets, with associated granuloma tissue, are dissected, dried, and weighed. A compound is considered anti-inflammatory if the mean weight of granuloma tissue in the group of animals treated therewith, adjusted to compensate for variations in dissection technique, is significantly ($P \leq 0.05$) less than the corresponding weight in the control group. A total ($2 \times 0.25$ mg.) dose of 0.5 mg. of hydrocortisone, administered subcutaneously, prevents the growth of granuloma tissue in this test.

Those skilled in the art will recognize that observations of activity in standardized tests for particular biological effects are fundamental to the development of valuable new drugs, both veterinary and human. Distinct from such applications, anti-algal compounds are adapted to the conditioning of boiler feedwater and the like, and anti-germinant compounds serve as herbicides.

Preparation of the 2-thioimidazoles of this invention, as distinct from the subject sulfoxides and sulfones, proceeds by heating a 2-imidazolethiol of the formula

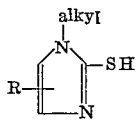

with a substituted alkyl halide of the formula

Y—alkylene—Z in a solvent such as dioxane, 2-propanol, methanol, ether, or a mixture thereof, R and Z in the formulas being defined as before and Y representing chlorine or bromine. The resultant, corresponding acid addition salt is converted to the base upon alkalization. Illustrative of bases thus conventionally prepared from corresponding acid addition salts are 2-furfurylthio-1-methylamidazole, 1-methyl-2-(5-nitrofurfurylthio)imidazole, 2-(o-butylthiobenzylthio)-methylimidazole, and 1-methyl-2-(p-methylsulfonylbenzylthio)imidazole. The original, or a different, acid addition salt can be prepared from such base by mixing with 1 equivalent of any of various inorganic and strong organic acids, the anionic portion of which conforms to T as hereinbefore defined. Alternatively, the base is converted to a quaternary salt by contacting in an inert solvent such as chloroform, acetone, butanone, methanol, butanol, or the like with 1 equivalent of an organic ester of the formula

QT

Q and T being defined as before. Quaternization is commonly carried out at temperatures ranging from 5 to 100° in from 1 hr. to 5 days, a closed system being employed if a volatile lower alkyl halide—such as methyl chloride—is the ester involved.

From the basic 2-thioimidazoles hereof, on contacting with cold m-chloroperbenzoic acid in chloroform solution, the corresponding sulfoxides of this invention are obtained. They in turn, are converted to the opposite sulfones if the temperature be elevated and/or the reaction time prolonged. Alternatively, hydrogen peroxide in hot acetic acid solution can be used to oxidize the sulfides to sulfoxides and sulfones, the degree of oxidation being determined by the length of the reaction time.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade, pressures in millimeters of mercury, and relative amounts of materials in parts by weight, except as otherwise noted.

EXAMPLE 1

2-furfurylthio-1-methylimidazole hydrochloride

A mixture of approximately 117 parts of 2-chloromethylfuran and 114 parts of 1-methyl-2-imidazolethiol is dissolved in 1000 parts of warm dioxane. The oil which separates crystallizes on standing at room temperature. The crystalline product, filtered off and dried in vacuo, melts at 107–109°. This material is 2-furfurylthio-1-methylimidazole hydrochloride, having the formula

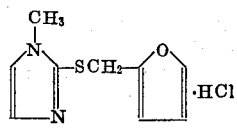

EXAMPLE 2

2-[(2-furfurylethyl)thio]-1-methylimidazole hydrochloride

A mixture of 290 parts of 3-(2-furyl)propyl chloride, 228 parts of 1-methyl-2-imidazolethiol, and 800 parts of 2-propanol is heated at 90° overnight, whereupon solvent is removed to the point of incipient precipitation by vacuum distillation. The residue is chilled. The precipitate which forms is filtered off and dried in air. The product thus isolated is 2-[(2-furfurylethyl)thio]-1-methylimidazole hydrochloride, having the formula

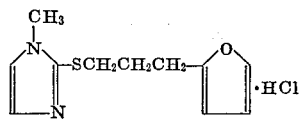

EXAMPLE 3

2-furfurylthio-1-propylimidazole

To a solution of 36 parts of 1-propyl-2-imidazolethiol in 200 parts of warm 2-propanol is added 30 parts of 2-chloromethylfuran dissolved in approximately 600 parts of ether. Solvents are removed by vacuum distillation and the residue taken up in water. The aqueous solution is neutralized with sodium bicarbonate and the resultant mixture is extracted with ether. The ether extract is dried over anhydrous sodium sulfate and stripped of solvent by distillation. The residue is taken up in benzene; and the benzene solution is chromatographed on silica gel, using benzene and mixtures thereof with increasing amounts of ethyl acetate as developing solvents. From an eluate comprising 10% ethyl acetate in benzene, on evaporation of solvent, 2-furfurylthio-1-propylimidazole is obtained as an oily residue. The product has the formula

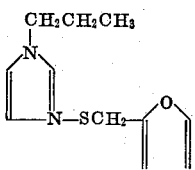

EXAMPLE 4

2-furfurylthio-1,4-dimethylimidazole

To a solution of 32 parts of 1,4-dimethyl-2-imidazolethiol in 400 parts of warm 2-propanol is added 30 parts of 2-chloromethylfuran dissolved in approximately 600 parts of ether. Solvents are then removed by distillation, and the residue is taken up in water. The water solution is mixed with decolorizing charcol and filtered, whereupon the filtrate is neutralized with sodium bicarbonate. The resultant mixture is extracted with ether. The ether extract is dried over anhydrous sodium sulfate and stripped of solvent by vacuum distillation. The residue is 2-furfurylthio-1,4-dimethylimidazole, having the formula

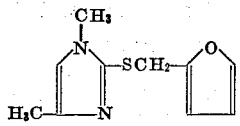

EXAMPLE 5

5-ethyl-2-furfurylthio-1-methylimidazole hydrochloride

To a solution of 36 parts of 5-ethyl-1-methyl-2-imidazolethiol in 400 parts of warm 2-propanol is added 30 parts of 2-chloromethylfuran dissolved in approximately 600 parts of ether. Solvents are then removed by distillation, and the residue is taken up in water. The water solution is mixed with decolorizing charcoal and filtered, whereupon the filtrate is neutralized with sodium bicarbonate. The resultant mixture is extracted with ether. The ether extract is dried over anhydrous sodium sulfate, whereupon sufficient hydrogen chloride dissolved in 2-propanol to induce acidity is introduced. The resultant precipitate is filtered off and recrystallized from a mixture of 2-propanol and ether to give 5-ethyl-2-furfurylthio-1-methylimidazole hydrochloride melting at 118–120°. The product has the formula

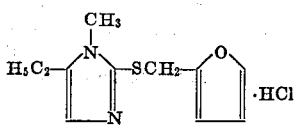

EXAMPLE 6

1-methyl-2-(5-nitrofurfurylthio)imidazole hydrochloride

A solution of approximately 80 parts of 2-chloromethyl-5-nitrofuran in 1120 parts of ether is diluted with 800 parts of dioxane, whereupon 57 parts of 1-methyl-2-imidazolethiol is introduced. Ether is then removed by distillation, and the distilland is chilled. The solid precipitate which forms, filtered off and recrystallized from a mixture of methanol, acetone and ether, is 1-methyl-2-(5-nitrofurfurylthio)imidazole hydrochloride melting at approximately 158.5–159° with decomposition. The product has the formula

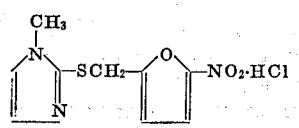

EXAMPLE 7

2-(5-nitrofurfurylthio)-1-propylimidazole

To a solution of 36 parts of 1-propyl-2-imidazolethiol in 500 parts of warm dioxane is added 40 parts of 2-chloromethyl-5-nitrofuran dissolved in 700 parts of ether. Solvents are removed by vacuum distillation under nitrogen, and the residue is taken up in water. The aqueous solution is washed with ether and neutralized with sodium bicarbonate. The resultant mixture is extracted with ether, and the ether extract is dried over anhydrous sodium sulfate and stripped of solvent by vacuum distillation. The residue is taken up in benzene; and the benzene solution is chromatographed on silica gel, using benzene and increasing amounts of ethyl acetate as developing solvents. From an eluate comprising 40% ethyl acetate in benzene, on evaporation of solvent, 2-(5-nitrofurfurylthio)-1-propylimidazole is obtained as an oil. The product has the formula

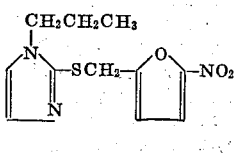

EXAMPLE 8

1-methyl-2-(p-methylthiobenzylthio)imidazole hydrochloride

A mixture of 95 parts of p-methylthiobenzyl chloride and 57 parts of 1-methyl-2-imidazolethiol in 500 parts of dioxane is stirred and heated at around 90° overnight, whereupon insoluble solids are filtered out and dried in air. The product thus isolated is 1-methyl-2-(p-methylthiobenzylthio)imidazole hydrochloride melting at 162.5–164°. It has the formula

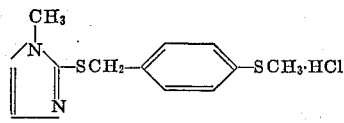

EXAMPLE 9

(A) Ethyl o-(butylthio)benzoate

A mixture of 100 parts of ethyl o-fluorobenzoate, 63 parts of 1-butanethiol, 40 parts of sodium methoxide, and 240 parts of absolute ethanol is stirred and heated at the boiling point under reflux for approximately 3 weeks, then cooled and poured onto 3000 parts of ice. The resultant mixture is extracted with dichloromethane. The extract is washed with water, dried over anhydrous sodium sulfate, and subjected to vacuum distillation. The fraction boiling at 145–168°/15 mm. pressure is ethyl o-(butylthio)benzoate.

(B) o-(Butylthio)benzyl alcohol

A solution of 172 parts of ethyl o-(butylthio)benzoate in 700 parts of ether is slowly added to a slurry of 38 parts of lithium tetrahydroaluminate in 1400 parts of ether. The resultant mixture is allowed to stand overnight, whereupon 180 parts of ethyl acetate followed by 100 parts of 10% sulfuric acid is introduced. The mixture thus obtained is filtered through diatomaceous earth, wherepon the nonaqueous phase is separated, dried over anhydrous sodium sulfate, and stripped of solvent by vacuum distillation. The reside is o-(butylthio)benzyl alcohol.

(C) o-Butylthio)benzyl chloride

A solution of 134 parts of o-(butylthio)benzyl alcohol in 180 parts of benzene is slowly added to a mixture of 123 parts of thionyl chloride, 10 parts of pyridine, and 540 parts of benzene. The resultant solution is heated at the boiling point under reflux for 2 hours, then stripped of solvent by vacuum distillation. The residue is partitioned between dichloromethane and water. The dichloromethane phase is separated, washed with aqueous 5% sodium bicarbonate, dried over anhydrous sodium sulfate, and stripped of solvent by vacuum distillation. The residue is o(butylthio)benzyl chloride.

(D) 2-(o-butylthiobenzylthio)-1-methylimidazole hydrochloride

A mixture of 22 parts of o-(butylthio)benzyl chloride and approximately 11 parts of 1-methyl-2-imidazolethiol in 80 parts of dioxane is stirred and heated at around 90° overnight, whereupon insoluble solids are filtered out and dried in air. The product thus isolated is 2-(o-butylthiobenzylthio)-1-methylimidazole hydrochloride which, recrystallized from a mixture of dichloromethane, acetone, and ether, melts at 97–100°. The product has the formula

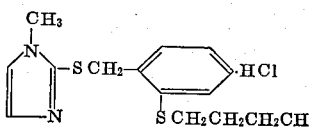

EXAMPLE 10

(A) 1-methyl-2-(p-methylsulfonylbenzylthio) imidazole hydrochloride

Substitution of 108 parts of p-methylsulfonylbenzyl chloride for the p-methylthiobenzyl chloride called for in Example 8 affords, by the procedure there detailed, 1-methyl-2-(p-methylsulfonylbenzylthio)imidazole hydrochloride which, recrystallized from a mixture of methanol and 2-propanol, melts at 131–133°. The product thus obtained is solvated with ⅜ mole of 2-propanol. Solvent of crystallization is removed by heating in vacuo.

(B) 3-ethyl-1-methyl-2-(p-methylsulfonylbenzylthio)imidazolium iodide

A solution of 50 parts of 1-methyl-2-(p-methylsulfonylbenzylthio)imidazole hydrochloride in 500 parts of water is neutralized with sodium carbonate. The resultant mixture is extracted with dichloromethane. The dichloromethane extract is washed with water, dried over anhydrous sodium sulfate, and stripped of solvent by vacuum distillation. The residue is mixed with 35 parts of ethyl iodide and 200 parts of acetone. The mixture is allowed to stand in a closed vessel protected from light for 1 week, whereupon the oil which settles out is freed of supernatant liquid by decantation, successively washed with ether and a mixture of acetone and ether, and dried in vacuo. The resultant glass is washed by trituration with a mixture of acetone and ether. The product thus isolated is 3-ethyl-1-methyl-2-(p-methylsulfonylbenzylthio)imidazolium iodide melting at 69–74° with decomposition.

(C) 3-(3,4-dichlorobenzyl)-1-methyl-2-(p-methylsulfonylbenzylthio)imidazolium chloride A solution of 50 parts of 1-methyl-2-(p-methylsulfonylbenzylthio)imidazole hydrochloride in 500 parts of water is neutralized with sodium carbonate. The resultant mixture is extracted with dichloromethane. The dichloromethane extract is washed with water, dried over anhydrous sodium sulfate, and stripped of solvent by vacuum distillation. The residue is mixed with 35 parts of 3,4-dichlorobenzyl chloride and 200 parts of acetone. The resultant mixture is allowed to stand for 1 week in a closed vessel protected from light, whereupon solvent is removed by distillation and the residue is dried in vacuo. The glass thus isolated is washed by trituration with ether. The product is 3-(3,4-dichlorobenzyl)-1-methyl-2-(p-methylsulfonylbenzylthio)imidazolium chloride melting at 59–63°. It has the formula

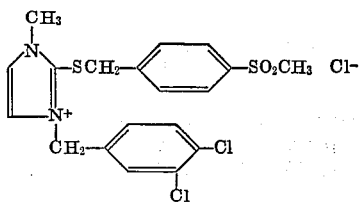

EXAMPLE 11

1-methyl-2-(p-methylsulfonylbenzylsulfinyl)imidazole

A solution of 308 parts of 1-methyl-2-(p-methylsulfonyl-benzylthio)imidazole hydrochloride in 10 volumes of water is neutralized with sodium carbonate, the resultant mixture is extracted with ether, the extract is washed with water and then stripped of solvent by vacuum distillation, the residue is dissolved in 2500 parts of glacial acetic acid, and to this solution is added 133 parts of 30% hydrogen peroxide. The resultant solution is heated at 90–95° for 1½ hours, then stripped of solvent by vacuum distillation. The residual yellow oil, which solidifies on standing, is taken up in approximately 20 volumes of a 2:1 mixture of chloroform and methanol. This solution is filtered through neutral alumina, and the filtrate is concentrated to the point of incipient precipitation by distillation. From the concentrate, on chilling, 1-methyl-2-(p-methylsulfonylbenzylsulfinyl)imidazole melting at 165–167° precipitates. The product has the formula

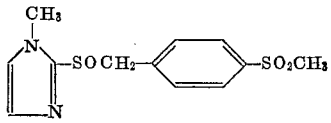

EXAMPLE 12

1-methyl-2-(p-methylsulfonylbenzylsulfonyl)imidazole

A solution of 65 parts of 1-methyl-2-(p-methylthiobenzylthio)imidazole hydrochloride in 10 volumes of water is neutralized with sodium carbonate, the resultant mixture is extracted with ether, the extract is washed with water and then stripped of solvent by vacuum distillation, the residue is dissolved in 400 parts of glacial acetic acid, and to this solution is added 150 parts of 30% hydrogen peroxide. The resultant solution is heated at 90–95° for 8 hours, then diluted with 2 volumes of water. The mixture thus obtained is extracted with chloroform. The chloroform extract is thoroughly washed with water, dried over sodium sulfate, and stripped of solvent by vacuum distillation. The residue is taken up in approximately 20 volumes of a 2:1 mixture of chloroform and methanol. This solution is filtered through neutral alumina, and the filtrate is concentrated to the point of incipient precipitation by distillation. From the concentrate, on chilling, 1-methyl - 2 - (p - methysulfonylbenzylsulfonyl)imidazole melting at 181–182.5° precipitates. The product has the formula

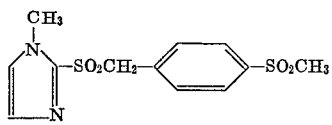

EXAMPLE 13

(A) 2-(p-methylsulfonylbenzylthio)-1-propylimidazole hydrochloride

A mixture of 190 parts of p-methylsulfonylbenzyl chloride and 128 parts of 1-propyl-2-imidazolethiol in 400 parts of 2-propanol is stirred and heated at around 90° overnight, whereupon insoluble solids are filtered out and dried in air. The product thus isolated is 2-(p-methylsulfonylbenzylthio-1-propylimidazole hydrochloride melting at 195.5–197°.

(B) 2-(p-methylsulfonylbenzylthio)-1-propylimidazole

A solution of 10 parts of 2-(p-methylsulfonylbenzylthio)-1-propylimidazole hydrochloride in 100 parts of water is neutralized with sodium hydroxide. The oil thrown down is extracted with dichloromethane. The dichloromethane extract is washed wth water, dried over anhydrous sodium sulfate, and stripped of solvent by distillation. The oily residue is 2-(p-methylsulfonylbenzylthio)-1-propylimidazole. It has the formula

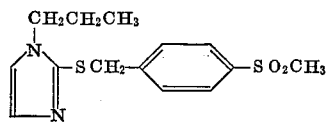

EXAMPLE 14

2-(p-methylsulfonylbenzylsulfonyl)-1-propylimidazole

To a solution of 45 parts of 2-(p-methylsulfonylbenzylthio)-1-propylimidazole in 200 parts of glacial acetic acid is added 90 parts of 30% hydrogen peroxide. The resultant solution is heated at 90–95° for 2½ hours, then diluted with 2 volumes of water. The mixture thus obtained is extracted with chloroform. The chloroform extract is thoroughly washed with water, dried over sodium sulfate, and stripped of solvent by vacuum distillation. The residue is taken up in approximately 20 volumes of a 2:1 mixture of chloroform and methanol. This solution is filtered through neutral alumina, and the filtrate is concentrated to the point of incipient precipitation by distillation. From the concentrate, on chilling, 2-(p-methylsulfonylbenzylsulfonyl) - 1 - propylimidazole melting at 158.7–159.3° precipitates. The product has the formula

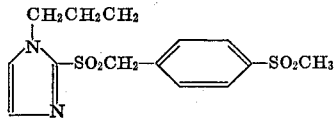

EXAMPLE 15

(A) o-Butylsulfonylbenzyl chloride

To a cold solution of 107 parts of o-(butylthio)benzyl chloride in 2700 parts of chloroform is added a total of 256 parts of 67.5% m-chloroperbenzoic acid in 3 equal portions during 1 hour. The resultant mixture is held at around 5° overnight, then filtered. The filtrate is stripped of solvent by vacuum distillation. The residue is taken up in benzene; and the benzene solution is chromatographed on silica gel, using benzene and increasing amounts of ethyl acetate as developing solvents. From an eluate comprising 2% ethyl acetate in benzene, on evaporation of solvent, p - butylsulfonylbenzyl chloride is obtained.

(B) 2-(o-butylsulfonylbenzylthio)-1-methylimidazole hydrochloride

Substitution of approximately 25 parts of o-butylsulfonylbenzyl chloride for the o-(butylthio)benzyl chloride called for in Example 9D affords, by the procedure there detailed, 2-(o-butylsulfonylbenzylthio)-1-methylimidazole hydrochloride melting at 126.5–128°. The product has the formula

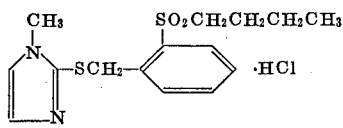

EXAMPLE 16

1-methyl-2-(p-sulfamoylbenzylthio)imidazole hydrobromide

Substitution of 125 parts of p-sulfamoylbenzyl bromide for the p-methylthiobenzyl chloride called for in Example 8 affords, by the procedure there detailed, 1-methyl-2-(p-sulfamoylbenzylthio)imidazole hydrobromide which, recrystallized from a mixture of methanol and acetone, melts at approximately 192–193°. The product has the formula

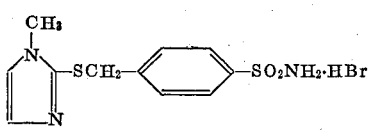

What is claimed is:
1. A compound of the formula

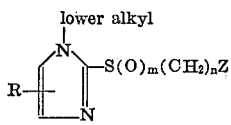

wherein R represents hydrogen or lower alkyl, $m$ represents 0 or a positive integer less than 3, $n$ represents a positive integer less than 4, and Z represents 2-furyl, 5-nitro-2-furyl, or substituted phenyl of the formula

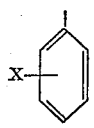

in which X represents (lower alkyl)thio, (lower alkyl)=sulfonyl, or sulfamoyl.

2. A compound according to claim 1 having the formula

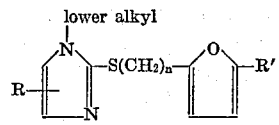

wherein R represents hydrogen or lower alkyl, $n$ represents a positive integer less than 4, and R' represents hydrogen or nitro.

3. A compound according to claim 1 having the formula

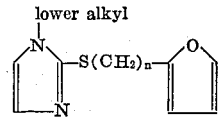

wherein $n$ represents a positive integer less than 4.

4. A compound according to claim 1 which is 2-furfurylthio-1-methylimidazole.

5. A compound according to claim 1 having the formula

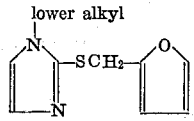

6. A compound according to claim 1 which is 1-methyl-2-(5-nitrofurfurylthio)imidazole.

7. A compound according to claim 1 which is

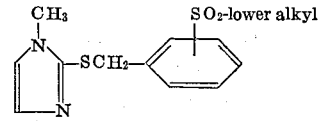

8. A compound according to claim 1 which is 2-(o-butylthiobenzylthio)-1-methylimidazole.

9. A compound according to claim 1 having the formula

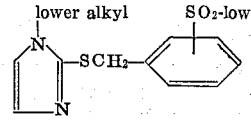

10. A compound according to claim 1 which is 1-methyl-2-(p-methylsulfonylbenzylthio)imidazole.

11. A compound according to claim 1 having the formula

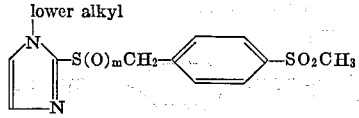

wherein $m$ represents a positive integer less than 3.

12. A compound according to claim 1 which is 1-methyl-2-(p-methylsulfonylbenzylsulfonyl)imidazole.

References Cited

UNITED STATES PATENTS 3,499,001   3/1970   Lutz _____ 260—309

FOREIGN PATENTS 660,836   9/1965   Belgium _____ 260—309
746,007   11/1966   Canada _____ 260—309

OTHER REFERENCES

Dunn et al.: J. Med. Chem., vol. 9, pp. 751–3 (1966).
Weitzel et al.: Hoppe-Seyler's Z. Physiol. Chem., vol. 348, p. 1279 relied on (1967).
Farrington: Aust. J. Chem., vol. 17, pp. 230–2 (1964).

NATALIE TROUSOF, Primary Examiner

U.S. Cl. X.R.

424—273